Nov. 21, 1967 R. W. ANTHONY ET AL 3,353,392
PITCH DIAMETER ROUNDER
Filed June 21, 1965 3 Sheets-Sheet 1

INVENTORS
RUSSEL W. ANTHONY
CARL H. MOTZ
ATTORNEYS

Nov. 21, 1967  R. W. ANTHONY ET AL  3,353,392

PITCH DIAMETER ROUNDER

Filed June 21, 1965  3 Sheets-Sheet 2

INVENTORS
RUSSEL W. ANTHONY
CARL H. MOTZ

ATTORNEYS

United States Patent Office 3,353,392
Patented Nov. 21, 1967

3,353,392
PITCH DIAMETER ROUNDER
Russell W. Anthony, Detroit, and Carl H. Motz, Harper Woods, Mich., assignors to National Broach & Machine Company, Detroit, Mich., a corporation of Michigan
Filed June 21, 1965, Ser. No. 465,487
12 Claims. (Cl. 72—110)

ABSTRACT OF THE DISCLOSURE

A pitch diameter rounder for an internally toothed annular gear comprising a plurality of circumferentially spaced preferably diametrically opposite pinions in pressure contact with the gear to effect burnishing and nick removal, and externally applied rollers preferably diametrically arranged and midway between the pinions to apply radial inward pressure to the smooth periphery of the gear to distort the gear beyond its elastic limit in which the gear is rotated at least once and preferably several rotations while distorted, and in which the application of external pressure through the rollers is gradually removed throughout at least one and preferably several complete rotations.

---

It is an object of the present invention to provide a novel method and apparatus for correcting out-of-round or ovality of annular gears by the application of radially inwardly directed pressure to the outer surface of the gears.

It is a further object of the present invention to provide a method and apparatus as described in the preceding paragraph which includes effecting relative rotation between the zones of pressure application and the gear, and a gradual reduction of the forces during continued relative rotation.

More specifically, it is an object of the present invention to provide a method and apparatus in which radially inwardly directed pressure is applied to the outer surface of the gear through a pair of diametrically opposed rollers, the magnitude of such force being sufficient to stress the gear beyond its elastic limit, effecting relative rotation between the gear and the zones of pressure application, and gradually reducing such forces to within the elastic limit of the gear throughout at least one complete relative rotation.

It is a further object of the present invention to provide a method and apparatus as described in the preceding paragraph in which the gear is driven in rotation through a pinion in mesh with the gear.

It is a further object of the present invention to provide a method and apparatus as described in the preceding paragraph in which a pair of diametrically opposed pinions are in mesh with the internal gear and are urged radially outwardly to maintain tight mesh with the teeth of the gear under pressure conditions sufficient to produce substantial reduction or removal of nicks and burrs and to burnish the teeth.

It is a further object of the present invention to provide apparatus for correcting ovality of annular gears comprising a pair of pinions positioned to mesh at diametrically opposite points within an annular gear, a pair of rollers positioned to engage the outer surface of the gear at zones spaced about 90 degrees circumferentially of the gear from the zones of mesh with the pinions.

It is a further object of the present invention to provide apparatus as described in the preceding paragraph in which means are provided for rotating at least one of the pinions to thereby drive the gear in rotation.

It is a further object of the present invention to provide apparatus as described in the preceding paragraph in which the rollers are maintained at a spacing to stress the gear beyond its elastic limit for at least one rotation thereof, and in which the rollers are moved to reduce the stress on the gear to within the elastic limit throughout at least one complete rotation thereof.

Other objects and features of the invention will become apparent as the description proceeds, especially when taken in conjunction with the accompanying drawings, illustrating a preferred embodiment of the invention, wherein.

Figure 1:
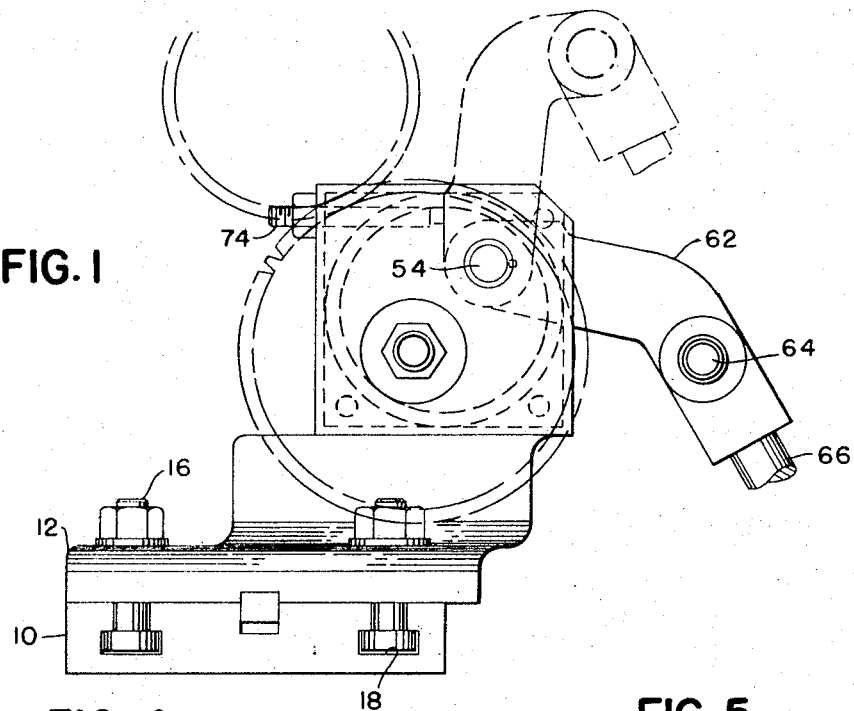
FIGURE 1 is a side elevational view of the apparatus for correcting ovality with the mechanism for applying radially inwardly directed pressure omitted for clarity.
Figure 4:
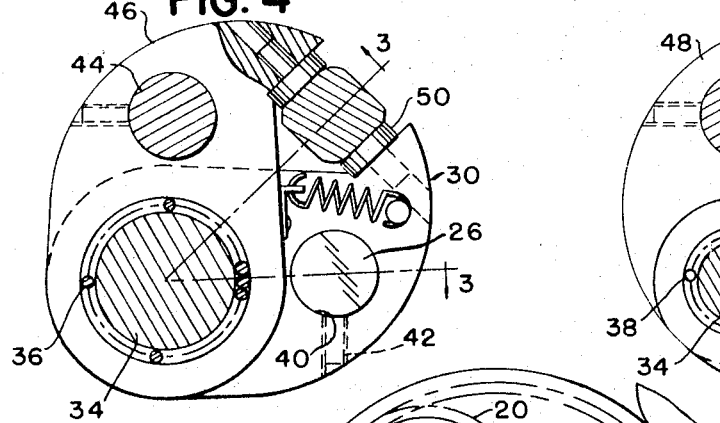
Figure 5:
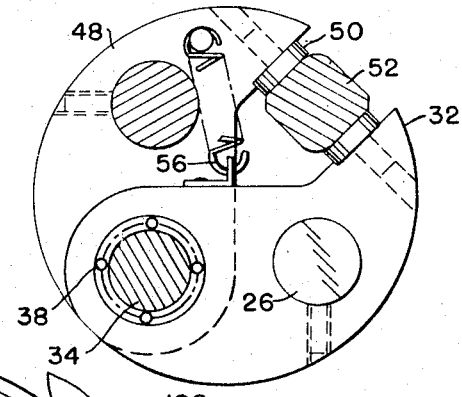
Figure 6:
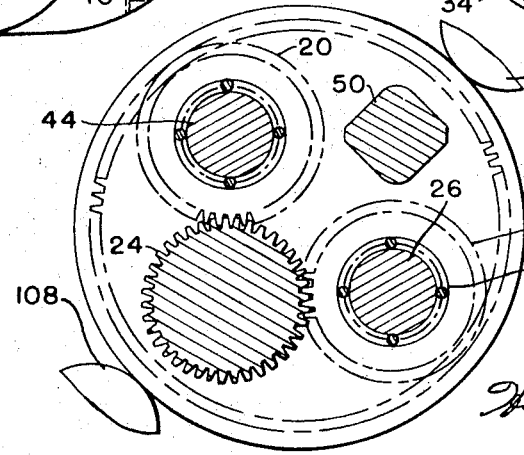
Figure 2:
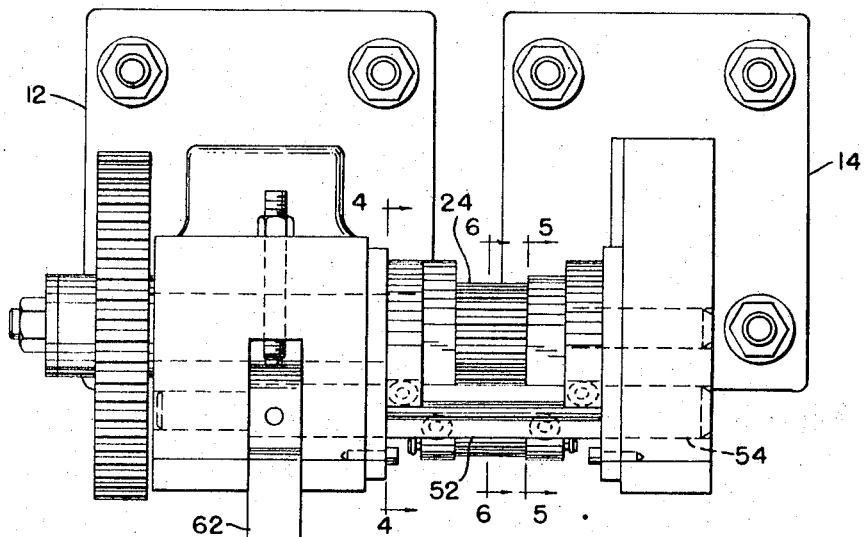
FIGURE 2 is a plan view of the apparatus seen in FIGURE 1, with the same parts omitted.

FIGURES 4, 5 and 6 are fragmentary sectional views taken on the lines 4—4, 5—5, and 6—6, respectively, FIGURE 2.

Figure 7:
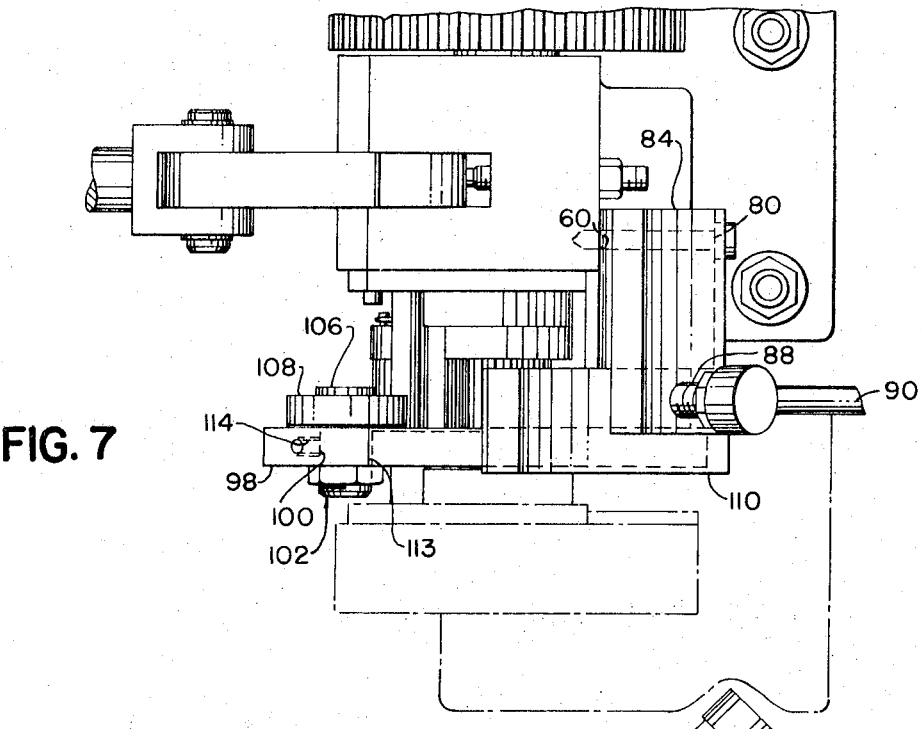

FIGURE 7 is a plan view similar to FIGURE 2 showing the mechanism for applying external pressure in place.

Figure 8:
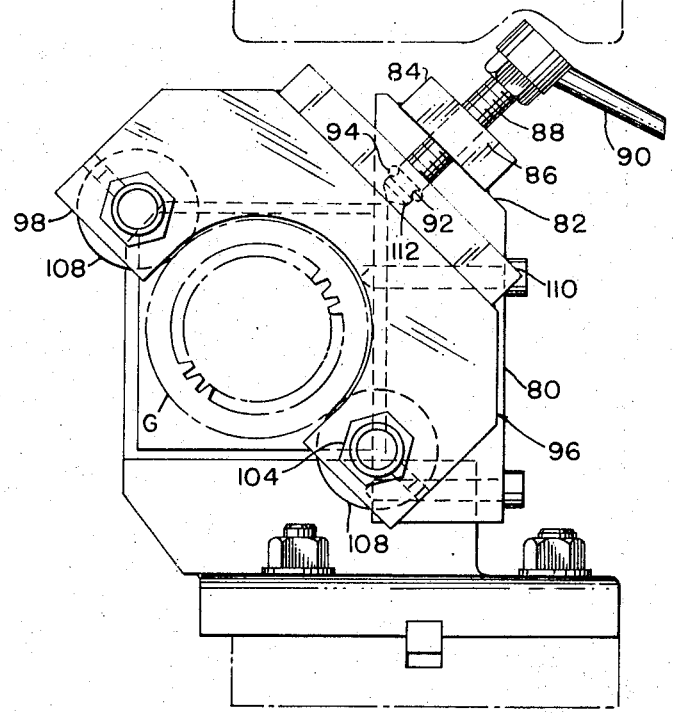

FIGURE 8 is a side elevational of the structure shown in FIGURE 2.

The present invention relates to a method and apparatus useful in final treatment of ring gears after a final heat treat operation. It has been found that ring gears after the final heat treat operation commonly are distorted so that the pitch line of the teeth at the interior thereof does not occupy a true circle. This condition is generally referred to as ovality. At the present time, ovality of ring gears presents a very serious problem. In the first place, there is not available a completely satisfactory method of determining a condition of ovality of the pitch circle. It is desirable to correct ovality without reference to the outside diameter of the part because of the fact that the teeth are not ordinarily qualified with respect to the outside diameter.

In the past when a condition of ovality was found to exist its correction has been by the application of forces along the long axis of the part to exceed the elastic limit and so to provide a residual strain. It is generally impossible to determine the proper magnitude of force to exactly correct ovality, even assuming that ovality can be completely corrected by the application of force to two points along the long axis of the part.

In accordance with the present invention, the annular gear is subjected to a treatment without attempting to determine the magnitude of ovality or even whether ovality exists or not. This treatment consists in the application of radially inwardly acting forces on the gear at substantially diametrically oppositely located points, of a magnitude substantially in excess of the elastic limit of the gear, accompanied by relative rapid rotation of the gear and a gradual reduction in the magnitude of the forces until the forces pass below the elastic limit. It is found that with this treatment ovality of the ring gear may be reduced substantially below .001".

The amount of correction thus available makes it possible to maintain the tolerances of ring gears with regard to ovality at values representing only a fraction of the tolerances forced upon industry in the past by the lack of efficient means means for correcting ovality. It has been common practice to accept internal gears having ovality of as much as .005".

The gears when subjected to a treatment for correcting ovality are ordinarily in the final condition following heat treatment. By employing hardened pinions in mesh with the internal gear at diametrically opposite points at zones spaced about 90° circumferentially from the zones of engagement with external rolls as the means for applying radially outward forces thereto, it is possible to obtain further advantages by the present method in that the hardened pinions operate under sufficient pressure to produce a burnishing of the teeth of the gear and also tend to eliminate nicks and burrs which may have been formed in the teeth thereof by mishandling during production.

In general terms, the correction of ovality is carried out by mounting an annular gear on a pair of pinions adapted to mesh with the annular gear at diametrically opposite points thereof, applying substantial forces to the gears urging them radially outwardly from the center of the annular gear into tight mesh therewith, the forces preferably being of a magnitude to remove minor nicks and burrs. Thereafter, or simultaneously therewith, radially inwardly directed forces of greater magnitude are applied by means of rollers to the outer surface of the gear at diametrically opposite points spaced approximately 90 degrees from the zones of mesh with the pinions. The magnitude of the radially inwardly directed forces is such as to produce a stress which exceeds the elastic limit of the gear. The gear is driven in rotation by rotating one or both of the pinions and the radially inwardly directed force applied by the rollers is gradually reduced throughout at least one complete rotation of the gear until the stress is within the elastic limit of the gear. Preferably, the pinions are maintained under such pressure with respect to the gear as to constitute efficient means for removing nicks and burrs and if desired, to burnish the teeth thereof.

The speed of rotation of the gear while the distorting force is maintained and while it is thereafter gradually removed, is substantial as for example about 60 r.p.m. In any case, the speed of rotation of the gear, for practical results in a reasonable time, should be at least 30 r.p.m. and may be as much as a few hundred r.p.m.

The time cycle required is of course reduced by limiting the application of maximum distorting pressure for as short an interval as possible and in gradually removing the distorted force in as short an interval as possible. However, it has been found that the distorting force should be maintained at its maximum for at least a complete revolution of the gear and the gradual removal of the distorting force should be throughout at least one complete revolution of the gear. In practice, the force is normally maintained for two or more revolutions and the removal of the distorting force is carried out throughout two or more complete revolutions.

In practice, a gear having a pitch diameter of about 4.5", a width of about 1.3", and a wall thickness of approximately .25" was stressed by the opposed rollers so that its pitch diameter across the minor diameter in line with the rollers was reduced approximately .075". A number of gears were tested in this apparatus and the gears were maintained under distortion for one or more complete revolutions while being rotated at a speed of approximately 60 r.p.m. Thereafter, the radially acting forces were gradually removed throughout continued rotation of at least one complete revolution of the gear.

The apparatus for supporting and driving and moving the internal pinions which support the internal gear will first be described in connection with FIGURES 1–6 of the drawing. Referring now to these figures the apparatus comprises a bed 10 on which a pair of mounting bases 12 and 14 are connected as by bolts 16 extending into T-slots 18 formed in the bed 10. It may be mentioned at this time that the base 14 carries an end plate 19 constituting an outboard support for a plurality of shafts, later to be described, and may be omitted if the shafts are of adequate strength and are adequately supported by structure carried by the mounting base 12.

Referring first to FIGURE 6, an annular gear G having internal teeth is illustrated as in mesh simultaneously with pinions 20 and 22 which are provided with means for moving them radially outwardly from the axis of the gear G. The pinions 20 and 22 are in loose mesh with a driving pinion 24 which rotates the pinions 20 and 22 and hence effects rotation of the gear G. The pinion 22 is mounted on a shaft 26 by needle bearings 28. The ends of the shaft 26 are carried by a pair of arms 30 and 32 which are pivoted to shaft 34 by bearings respectively indicated at 36 and 38. The ends of the shaft 26 are secured in place in openings 40 in the arms by threaded lock pins 42.

The pinion 20 is similarly mounted on a shaft 44 carried at its ends by arms 46 and 48. At the ends of the arms 30, 32, 46 and 48 opposite to their pivot mounting on the shaft 34 there are provided wear buttons 50 engageable with a camming section 52 of a shaft 54. As well illustrated in FIGURES 4 and 5, rotation of the camming section 52 through an angle of approximately 60 degrees in a counterclockwise direction as seen in these figures, will result in forcing the buttons 50 apart and correspondingly rocking the arms 30, 32, 46 and 48 in a direction to cause the pinions 20 and 22 to move substantially diametrically outwardly with respect to the annular gear G. The adjacent arms are interconnected by tension springs indicated at 56 which will retain the buttons 50 in contact with the caming section 52. The cam shaft 54 is mounted for rotation in an opening 58 in the mounting body 60 and has keyed or otherwise secured to it an operating arm 62, best seen in FIGURE 1. The operating arm 62 is connected by pivot means 64 to a piston rod 66 which in turn is connected to a piston (not shown) movable longitudinally in an actuating cylinder.

The pinion 24 is rigidly secured or formed integrally with the shaft 34 and is driven in rotation by a gear 68 splined thereto and in mesh with a gear 70 driven from a shaft 72 connected to a motor.

The outboard ends of the shafts 34 and 54 are supported for rotation in apertures or bearings in the end plate 19 as previously described. However, if the shafts, and particularly the shaft 34, are of adequate strength and are adequately supported the outboard support may be omitted. This is desirable because it facilitates loading and unloading of work gears G on the pinions 20 and 22.

Figure 3:
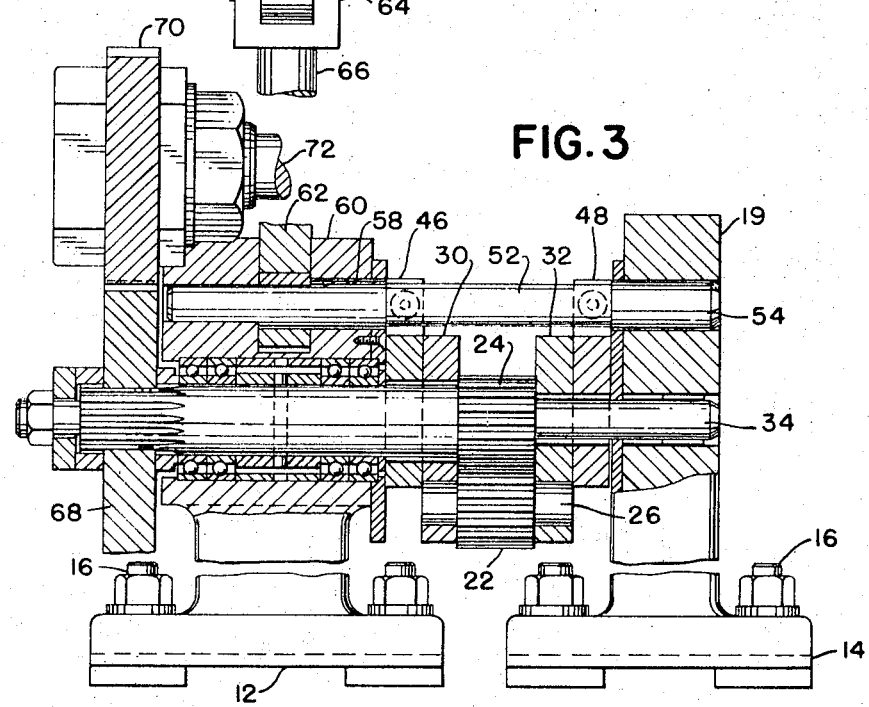
FIGURE 3 is a composite sectional view taken on the broken line 3—3, FIGURE 4.

Attention is particularly directed to the fact that FIGURE 3 is a sectional view taken on the discontinuous line 3—3, FIGURE 4 so that in this view the shafts 54, 34 and 26 all appear to be in the same plane. The actual relationship of these shafts is of course clearly illustrated in the sectional views of FIGURES 4–6.

In operation the cam shaft is rotated to a position in which the buttons 50 are at their closest approach and accordingly, the pinions 20 and 22 are moved radially inwardly into a position such that clearance will exist with respect to a work gear G loaded thereon, although the teeth of the pinion and work gear will be in loose mesh. It will be recalled that the operation is intended primarily for a final finishing operation on hardened annular gears. The pinion 24 is in loose mesh with the pinions 20 and 22. The backlash between the teeth of these pinions is such that the pinions 20 and 22 are rotationally positioned such that their teeth will enter into mesh with the proper tooth spaces in a work gear G.

Referring now to FIGURES 7 and 8, there is illustrated more particularly, the mechanism for applying radially inwardly directed force to the outer surface of the gear. The construction comprises a mounting bar 80 which is bolted or otherwise secured to the mounting body 60. As indicated in the figures, the bar 80 is of relatively massive square cross-section and its upper surface is beveled off at 45 degrees, such beveled surface being indicated at 82. Secured to the bar 80 is a plate 84 which extends laterally beyond the bar as indicated in FIGURE 7, and which is provided with an internally threaded opening 86 for the reception of a screw 88. A crank 90 is connected to one end of the screw and at its other end the screw shaft is provided with a semi-circular groove 92 for the reception of interlocking means 94 which will subsequently be described.

A plate 96 is provided in the form of a yoke having arms 98 each of which has an opening 100 for the reception of a pivot shaft 102 threaded at one end for the reception of a nut 104 and having a head 106 at the opposite end adapted to retain a roller 108 in position. It will be observed from FIGURE 7 that the center line of the screw 88 occupies a plane passing centrally through both rollers 108. The plate 96 has welded or otherwise secured thereto a plate 110 extending laterally beyond one side thereof, the plate 110 having an opening 112 which receives the end of the screw 88. The lock means 94, which may be in the form of a pin, extends into the opening and enters the annular groove 92. With this arrangement it is of course apparent that the screw 88 may rotate relative to the plate 110 but is effective to produce movement of the plates 110 and 96 longitudinally of the axis of the screw 88. As best seen in FIGURE 7, one edge of the plate 110 abuts one side of the bar 80 and thus serves to prevent rotation of the roll supporting yoke 96 as the screw shaft is rotated.

Means are provided for adjusting the spacing between the rollers 108 and this is accomplished by making the holes or openings 100 which receive the pivot shaft 102 oversize and by making the portion 113 of the shaft which supports the rollers slightly larger than the intermediate portion. This permits the pivot shaft to be clamped in adjusted position by tightening the nut 104 and this position of adjustment can be accurately determined by adjusting screws 114.

In practice, the spacing between the rollers 108 is adjusted to produce a predetermined distortion of the gear G and this distortion may be about .075", and within a range of .100 to .010". The magnitude of the distortion imparted to the gear depends upon gear characteristics but in any case it is sufficient to exceed the elastic limit of the gear so that if applied and removed, permanent distortion of the gear would result.

The operation of the apparatus will now be described. A work gear is mounted in loose mesh on the pinions 20 and 22 and fluid under pressure is admitted to the cylinder in which the piston connected to the piston rod 66 is movable, and the arm 62 is rotated to bring the high point on the camming section 52 between the generally opposed buttons 50, thus swinging the arms 30, 32, 46 and 48 in the directions required to move the pinions 20 and 22 apart. Movement of the arm 62 is limited by the adjustable stop screw 74 which may be adjusted to produce the required distortion of the gear G. The motor connected to the drive shaft 72 is energized either before or after operation of the piston, driving the pinion 24 in rotation and this in turn results in rotation of the pinions 22 and 24 and also rotation of the gear G. The speed of rotation is substantial, as for example about 60 r.p.m. for the gear. The force applied by the camming section 52 to the internal gear may be relatively great, as for example in excess of 1000 pounds. The magnitude of this force will of course depend upon the dimensions and characteristics of the gear. In any case, the force is sufficient to maintain the pinions in tight mesh with the gear so as to drive the gear effectively in rotation and also if desired, to produce a desirable burnishing and nick and burr removal.

Simultaneously with or immediately after operation of the lever arm 62, the rollers 108 are advanced to a position diametrically opposite each other wtih respect to the gear G. This will produce a major distortion of the gear exceeding the distortion initially applied by the pinions. In practice, as previously mentioned, the distortion applied by the rollers 108 will be between .100 and .010" and will normally be about .075".

While the gear is continuously rotated by continued rotation of the pinions, the yoke 96 is moved by operation of the crank 90 to effect gradual continuous withdrawal of the rollers.

It has been found that the gear G should be given at least one, and preferably two or more, complete revolutions while the rollers 108 remain in the most advanced position. Similarly, it has been found that the withdrawal of the rollers should be continuous throughout at least one complete rotation of the gear and preferably, should be at a rate such that the rollers are not completely withdrawn until the gear has made two or more complete revolutions.

It is to be stressed that the maximum correction of ovality is effected by the rollers 108. Since this is the case the pinions 20 and 22 may be regarded primarily as effecting support of the gear and as driving the gear in rotation, while at the same time effecting a burnishing operation on the teeth of the gear and removing nicks and burrs therefrom. As disclosed in a copending application of Russel W. Anthony, Ser. No. 465,486 filed concurrently herewith, there has been disclosed an operation in which the distorting force is applied solely through the internal pinions. It has been found that while this operation is satisfactory for certain gears, in other cases the correction of ovality is accompanied by some tendency to develop cracks in the gear at the roots of the teeth. This tendency is completely avoided when the forces are applied radially inwardly as by the rollers 108. It will be appreciated that the use of external rollers rather than internal pinions results in distortion of the gear by an operation in which it is basically under compression. On the other hand, distortion of the gear by the internal pinions places the gear in tension. Therefore, it is essential when correcting ovality in gears which have exhibited a tendency to develop cracks, to limit the force applied through the internal pinions to values well below those which tend to induce cracking.

It is to be observed that the application of radially inward pressure through the rollers is along an axis which is located at 90 degrees to the axis established by the pair of pinions. Application of the radially inwardly directed pressure by the rollers therefore not only reduces the minor diameter of the gear along a line connecting the rollers, but itself tends to produce elongation of the gear along an axis 90 degrees with respect to the line connecting the pinions. Therefore, under certain conditions if the pinions were first moved a predetermined distance to stress the gear and further movement was prevented as by operation of the stop 74, application of pressure and further distortion of the gear by the rollers 108 might bring the pinions into a condition of loose mesh or blacklash with respect to the gear. This may be avoided if desired. It will be desirable in some cases to back off the abutment screw 74 so as to permit the pinions to remain always in full mesh with the teeth of the gear and to be pressed against the gear with a force sufficient if desired to provide continued nick and burr removal, resulting from maintaining a predetermined pressure in the cylinder which actuates the arm 62.

While the mechanism for controlling the rollers which apply the radially inwardly directed pressure to the gear is illustrated as including a manually rotating crank, it will of course be apparent that power means may be provided including for example a piston and cylinder device such as is employed to actuate the pinions. The rate of removal of the radial forces, both the radially outwardly directed forces of the pinions and the radially inwardly directed forces of the rollers may of course be adjusted by suitably controlling the admission of fluid to the pistons and thus related as required to the speed of rotation of the work gear.

The drawings and the foregoing specification constitute a description of the improved pitch diameter rounder in such full, clear, concise and exact terms as to enable any person skilled in the art to practice the invention, the scope of which is indicated by the appended claims.

What we claim as our invention is:

1. The method of correcting ovality and simultaneously burnishing annular internal gear and removing nicks and burrs therefrom which comprises mounting the gear on a pair of internal pinions spaced about 180 degrees apart within the gear, driving the gear by rotating one of said pinions, forcing the pinions apart to maintain tight mesh engagement with the gear, applying radial inward forces to the outer surface of the gear at two zones spaced intermediate the zones of mesh of said pinions of a magnitude to distort the gear beyond its elastic limit, continuing at least one full rotation of the gear, and gradually removing said forces throughout at least one complete rotation of the gear.

2. The method of claim 1 which comprises distorting the gear to reduce its pitch diameter on the minor axis an amount equivalent to a reduction in pitch diameter between .100 and .010 inch for a gear of about 4.5" diameter.

3. The method of claim 1 which comprises distorting the gear to reduce its pitch diameter on the minor axis an amount equivalent to a reduction in pitch diameter of about .075 inch for a gear of about 4.5" diameter.

4. The method of claim 1 which comprises maintaining the pinions in pressure contact with the gear under forces sufficient to remove nicks and burrs.

5. Apparatus for correcting ovality of annular internal gears comprising a pair of pinions, means for driving at least one of said pinions in rotation, means for relatively moving said pinions away from each other to apply pressure to an internal gear in mesh therewith, a pair of rolls engageable with the outer surface of the gear at zones spaced about 90 degrees from the zones of mesh with said pinions, and means for moving said rolls relative to the gear to apply and remove radial inward forces thereto of a magnitude to exceed the elastic limit of the gear.

6. Apparatus as defined in claim 5 in which the means for moving the rolls relative to the gear includes means for controlling the rate of movement thereof.

7. Apparatus as defined in claim 5 which comprises a carrier for said rolls, and means for moving said carrier toward and away from the gear with the rolls moving generally tangentially with respect thereto.

8. Apparatus as defined in claim 5 which comprises means for adjusting the rate of removal of forces applied by said rolls to the outer surface of the gear.

9. The method of treating an internally toothed annular gear after heat treatment to remove ovality due to heat treatment and to remove nicks and burrs and to burnish the teeth of the gear which comprises meshing the gear with a plurality of pinions, urging said pinions relative to each other radially outwardly of the gear with sufficient force to remove nicks and burrs and to burnish the gear teeth, applying radially inwardly directed forces to the exterior of the gear at circumferentially spaced points of sufficient magnitude to distort the gear beyond its elastic limit, rotating the gear for at least a full rotation past the zones of force application and the location of said pinions, and gradually reducing the magnitude of the force during at least one further rotation of said gear.

10. The method of claim 9 in which said pinions are two in number substantially 180 degrees apart.

11. The method of claim 9 which comprises applying the radially inwardly directed forces by a pair of rolls substantially 180 degrees apart and each located intermediate the pinions.

12. The method of claim 11 which comprises driving the gear in rotation by driving one of said pinions in rotation.

References Cited

UNITED STATES PATENTS

| | | | |
|---|---|---|---|
| 199,482 | 1/1878 | Trethewey | 72—111 |
| 790,088 | 5/1905 | Thomas | 72—110 |
| 1,989,652 | 1/1935 | Drummond | 29—90 |
| 2,482,381 | 9/1949 | Stevens et al. | 80—60 X |
| 2,636,406 | 4/1953 | Salter | 72—111 |
| 3,000,426 | 9/1961 | Ducker et al. | 72—110 |

FOREIGN PATENTS

| | | |
|---|---|---|
| 930,807 | 7/1955 | Germany. |

RICHARD J. HERBST, *Primary Examiner.*

E. SUTTON, *Assistant Examiner.*